United States Patent [19]

Vennemeyer et al.

[11] Patent Number: 5,029,950
[45] Date of Patent: Jul. 9, 1991

[54] ANTI-LOCK BRAKING AND TRACTION CONTROL SYSTEM

[75] Inventors: Alfred C. Vennemeyer; Thomas H. Gardner, both of Engelwood

[73] Assignee: General Motors Corporation, Detroit, Mich.

[21] Appl. No.: 370,892

[22] Filed: Jun. 26, 1989

[51] Int. Cl.$^5$ .............................................. B60T 8/32
[52] U.S. Cl. ..................... 303/100; 303/110; 303/115; 180/197
[58] Field of Search ................. 303/110, 100, 93, 113, 303/114, 119, 115, 116, 61-63, 68-69, 13-14, 105; 188/181 A, 181 R; 180/197

[56] References Cited

U.S. PATENT DOCUMENTS

| | | | |
|---|---|---|---|
| 2,845,147 | 7/1958 | Hill | 188/521 |
| 3,549,210 | 12/1970 | Birge et al. | 303/21 |
| 3,698,772 | 10/1972 | Nixon | 303/21 |
| 3,790,225 | 2/1974 | Wehde | 303/21 |
| 3,802,745 | 4/1974 | Strifler et al. | 303/3 |
| 3,827,758 | 8/1974 | Hansen | 303/3 |
| 3,887,238 | 6/1975 | Bennett | 303/7 |
| 3,963,277 | 6/1976 | Chiba | 303/21 F |
| 4,381,049 | 4/1983 | Crossman | 188/72 |
| 4,398,389 | 8/1983 | Horvath | 60/545 |
| 4,520,907 | 6/1985 | Sikora | 188/156 |
| 4,653,815 | 3/1987 | Agarwal et al. | 303/100 |
| 4,756,391 | 7/1988 | Agarwal et al. | 188/106 |
| 4,865,397 | 9/1989 | Inoue et al. | 303/110 |
| 4,865,399 | 9/1989 | Atkins et al. | 303/110 X |
| 4,900,105 | 2/1990 | Burgdorf et al. | 303/110 X |
| 4,917,445 | 4/1990 | Leppek et al. | 303/115 X |
| 4,927,212 | 5/1990 | Harrison et al. | 303/115 |
| 4,938,543 | 7/1990 | Parker et al. | 303/100 |
| 4,957,331 | 9/1990 | Burton et al. | 303/115 |

Primary Examiner—Douglas C. Butler
Attorney, Agent, or Firm—Ernest E. Helms

[57] ABSTRACT

An anti-lock braking system (ABS) and traction control (TC) integration is provided including an actuator with fluid connections with a master cylinder, reservoir, and a wheel cylinder. A primary piston with an interior bore and a radial bore for selective alignment with the actuator fluid connections is slidably mounted in the actuator. A normally closed solenoid valve connects the reservoir with the actuator. A sensor determines wheel speed and generates a signal. The primary piston is moved along an actuator bore in response to the signal. The actuator also has a bore axial stop. A secondary piston is slidably mounted within the primary piston. The secondary piston has land surfaces forming a sealed chamber within the primary piston and a head section sealable mounted within the actuator bore exposed to the actuator connection with the wheel cylinder. The piston has an interior passage connecting the actuator connection with the wheel cylinder with the secondary piston sealed chamber.

8 Claims, 3 Drawing Sheets

ANTI-LOCK BRAKING AND TRACTION CONTROL SYSTEM

FIELD OF THE INVENTION

The field of the present invention is that of anti-lock braking systems (ABS) and traction control (TC) systems for automotive vehicles.

DISCLOSURE STATEMENT

Examples of an anti-lock braking system are provided in U.S. Pat. Nos. 4,653,815 and 4,756,391 commonly assigned.

SUMMARY OF THE INVENTION

The present invention provides an anti-lock braking system as an alternative to the systems described in the above-mentioned patents which also integrates a traction control system. Additionally, the present invention provides a traction control system wherein the motor utilized in the actuator can rotate in the same direction when being utilized for traction control or anti-lock braking system. In the anti-lock braking mode the motor will rotate in one direction to relieve pressure from the wheel cylinder and continue to rotate in the same given direction during the first pressure reapply after the system has entered into the anti-lock braking mode.

It is an object of the present invention to provide anti-lock braking system and traction control integration apparatus and method of utilization thereof.

Further objects and advantages of the present invention can become more apparent to those skilled in the art as the nature of the invention is better understood from the accompanying drawings and a detailed description.

DETAILED DESCRIPTION OF THE DRAWINGS

Figure 1:
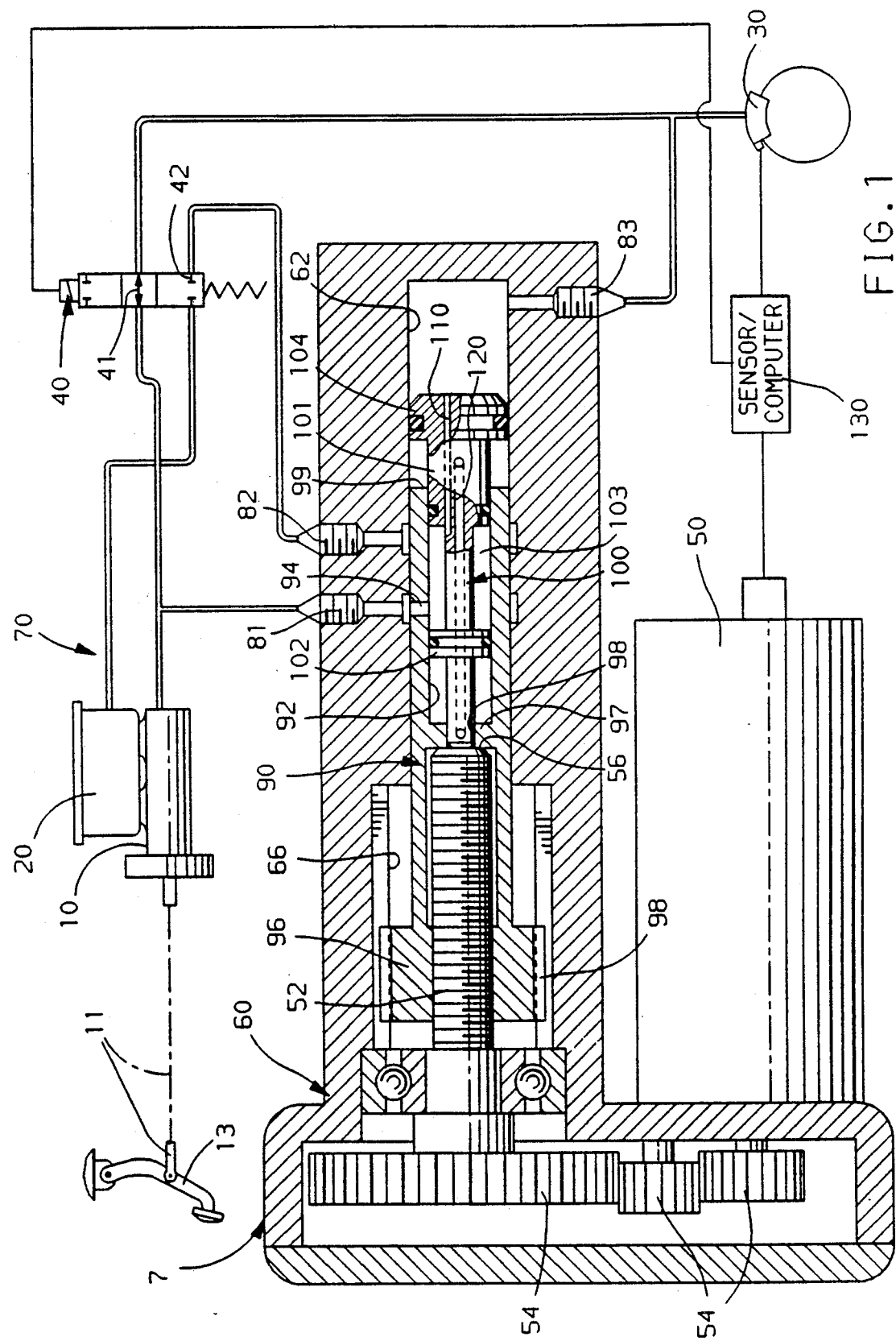
FIG. 1 is a sectional view with portions shown in schematic of a preferred embodiment anti-lock braking system traction control integration according to the present invention.

Referring to FIG. 1, the anti-lock traction control integration 70 of the present invention has a master cylinder 10. A brake pedal 13 is pivotally connected with a push rod 11 which controls operation of the master cylinder 10 in a conventional manner. The master cylinder has joined thereto a fluid reservoir 20. The master cylinder is also connected to the wheel brake cylinder 30 (Note: The wheel cylinder utilized in this application relates to disc brake calipers or to drum brake wheel cylinders.) via a dual line solenoid actuated valve means 40 having a normally open position for the connection between the master cylinder 10 the wheel cylinder 30. When activated the solenoid valve 40 will isolate the master cylinder 10 from the wheel cylinder 30.

An actuator 7 of the present invention is provided with movement means provided by a motor 50 typically electrically driven. The motor 50 is further operatively joined to an axially fixed screw or worm gear 52 by a plurality of intermediate gears 54.

The actuator 7 of the present invention is also provided with a housing 60. The housing has a central multi-diametered longitudinal bore 62. Intersecting the bore 62 is a first fluid connection 81 at a predetermined axial distance from the connection 81 is a second fluid connection 82. Axially spaced from the first 81 and second 82 connections typically along a blind end of the housing bore 62 is a third fluid connection 83.

The connection 81 is joined to the master cylinder 10. The connection 82 is joined with the solenoid valve 40. Upon energization of the solenoid valve 40 the second connection 82 is joined with the reservoir 20 via solenoid connection 42. In the normal braking mode the valve 40 prevents communication between connection 82 and the reservoir. The connection 83 is joined to the wheel cylinder 30.

Slidably mounted within the housing bore 62 and threadably engaged with the worm gear 52 is a primary piston 90. The piston 90 has an interior bore 92 with an intersecting radial bore 94. The bore 94 is provided for selective alignment with the first 81 or second 82 connections. The piston 90 as illustrated has an optional enlarged head section 96 for sliding engagement and alignment in a large diameter portion 66 of the interior bore 62. However, the housing enlarged section 96 portion typical will be vented. The piston 90 also has interior flange 97 with a central bore 98.

The enlarged section 96 as a tongue and groove type interconnection 98 with the large diameter portion 66 to prevent rotation of the piston 90 upon rotation of the worm gear 52.

Slidably mounted within the piston bore 62 is a secondary piston means 100. Piston 100 has a first 101 and second 102 landings which are sealably mounted (by captured O-rings) within the bore 92 forming a sealed chamber 103 therebetween. The piston 100 also has a head 104 section which is sealably mounted within the bore 62 and is fluidly exposed to the connection 83. A first interior passageway 110 connects the sealed chamber 103 with the head 104 of the piston 100. In an area adjacent to the head 104 but opposite the connection 83 is a second interior bore 120 providing a vent which extends beyond the second landing 102 which provides venting for the area beyond the second landing 102 to the area adjacent the head 104.

A sensor/computer means 130 is provided to sense the wheel speed and to generate a signal in response thereto. The sensor/computer 130 will signal the valve 40 and motor 50 to control actuator 7 in an ABS or TC modes as conditions mandates.

In the normal brake apply mode, the solenoid first passage 41 is normally open allowing direct fluid communication between the master cylinder 10 and the wheel cylinder 30. A second path of fluid communication is provided from the master cylinder 10 through the connection 81 into the bore 94 to the sealed chamber 103. Fluid then proceeds out the passageway 110 then proceeds past the head and out the connection 83 to the wheel cylinder 30. Therefore, in normal apply and in normal brake release, there are two fluid paths provided between the master cylinder 10 and the wheel cylinder 30. The piston 100 will be held by the stop means 56 provided by the end of the gear 52 because of the fluid pressure upon the head 104. (An optional light spring, not shown may be added to assist if desired.)

When an ABS condition is determined by the sensor/computer 130, a signal will be given to the valve 40 to energize, isolating the master cylinder 10 from the wheel cylinder 30. This is done to isolate normal brake path to eliminate pedal feel. The sensor/computer 130 will also signal motor 50 to rotate in a first predetermined angular direction to rotate the gear 52 in a first predetermined direction to advance the piston 90 towards the connection 83. The fluid pressure within the bore 62 adjacent the connection 83 will still maintain the piston 100 in a stationary position as the piston 90 has travel (to the right) in relation thereto. Upon initial movement of the piston 90 the bore 94 will come out of alignment with the connection 81, therefore, the master cylinder 10 is now additionally isolated from the wheel cylinder via the housing. Continued movement of the piston 90 will cause the bore 94 to come into alignment with the connection 82. The activation of the valve 40 has at the same time connected the reservoir 20 with the connection 82. When the bore 94 comes into alignment with the connection 82, fluid from the wheel cylinder 30 will be relieved into the reservoir 20 via the connection 83 and passageway 110 through and then out the bore 94 of the primary piston to the connection 82. (Note: Most ABS systems will mandate that there will be pressure in the wheel cylinder before 30 before ABS is initiated due to the vehicle operator stepping on the pedal 13.)

Typically, after the above described first release cycle in the ABS mode, the sensor/computer 30 will signal to again apply the brakes when the wheel speed picks up and skidding of the specified wheel (or wheels) has ceased. Thereupon, the motor 50 will continue to turn in the first predetermined angular direction urging the piston 90 in the same predetermined axial direction (towards the connection 83). The above movement will cause the bore 94 to come out of the alignment with the fluid connection 82. The space between the first 81 and second 82 connections typically will be the same as the space between an end 99 of the piston 90 and the head 104 of the secondary piston 100 in the normal brake apply mode. Therefore, as the piston 90 is continually moved forward, alignment of the bore 94 with the connection 82 be terminated and the piston 90 will contact the piston 100 (via the head 104) and will cause a pressure reapply. After the initial reapply the sensor/computer 130 will signal the motor 50 in such a manner to modulate the pressure within the wheel cylinder 30. (If desired, another portion of the piston 90 and piston 100 which will make contact can be altered. For instance, the flange 97 can contact the second landing 102 to move the piston 100.)

One of the great advantages of the actuator 7 is that the angular direction of the motor 50 and gear 2 and the axial travel of the piston 90 will be the same for the initial ABS release cycle and the initial reapply cycle. Since the directions are the same the actuator 7 does not suffer the time delay caused reversal in the direction of travel of the motor 50, gear 52 and piston 90. The inertia of the parts actually aids the integration to make the first ABS reapply faster. Approximately 60% better than that previously obtainable in a similar configuration wherein the motor 50 and gear 52 will have to stop and then be reversed between the initial ABS release and ABS pressure reapply cycles.

Another major advantage of the actuator 7 is that the valve 40 once cycled to the ABS mode is held, therefore, since the valve 40 is not cycled, as in many other ABS systems, response time can be maximized and design constraints mandated by transient flow rates between the opening and closing of the valve 40 are not nearly a greatest concern.

The actuator 7 works in substantially similar manner when utilized in a traction control mode. In the traction control mode the pressure within the wheel cylinder 30 is essentially equal to zero. The sensor/computer 130 sensing the wheel spin activates a signal for traction control and the valve 40 is actuated in the manner previously described. The motor 50 and will began rotation in the first predetermined angular direction to urge the piston 90 in the first axial direction as previously described. The alignment of the bore 94 with the connection 82 is of no significance since fluid pressure within the wheel cylinder 30 and the reservoir 20 are essentially equal, therefore, no flow condition will exist. Upon the continued forward travel of the piston 90 the piston 90 will make contact with the head 104 of the piston 100 and the first apply cycle of the traction control system will be manifested. Upon modulation of the traction control system, the motor 50 and gear 52 will be reversed. However, typically the reversal will be such that the secondary piston head 104 will still be maintained in contact with the end 94 of the primary piston.

In most applications the distance between the first 81 and second connections 81 will be the same as the distance between the primary piston end 99 and the secondary piston head 104 when the secondary piston 100 is held against the worm gear 52.

Figure 2:
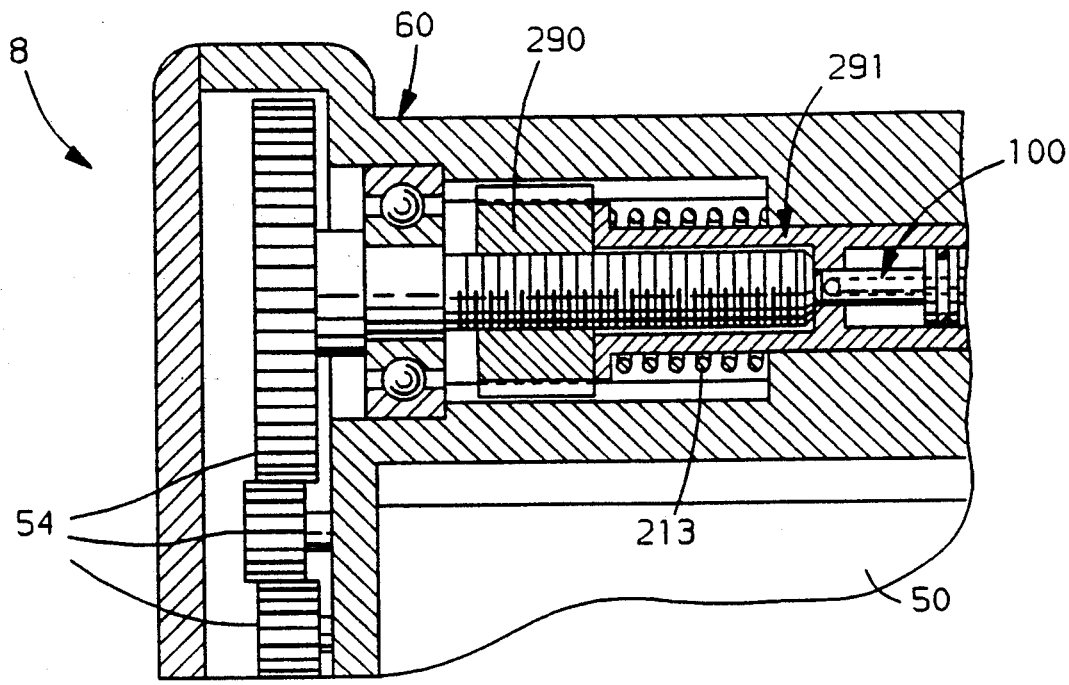
FIGS. 2, 3 and 4 are partial views similar to that of FIG. 1 illustrating alternative preferred embodiments of the present invention.

FIG. 2, provides an actuator 8 substantially similar to that shown in FIG. 1 with the exception that the worm gear is threadably connected with a nut 290 which pushes against the end of a modified primary piston 291. The pressure within the housing 60 (or a light biasing spring 213) will keep the primary piston 291 in contact with nut 290. The remainder of the actuator 8 is substantially the same as that described for actuator 7 and its operation is the same.

Figure 3:
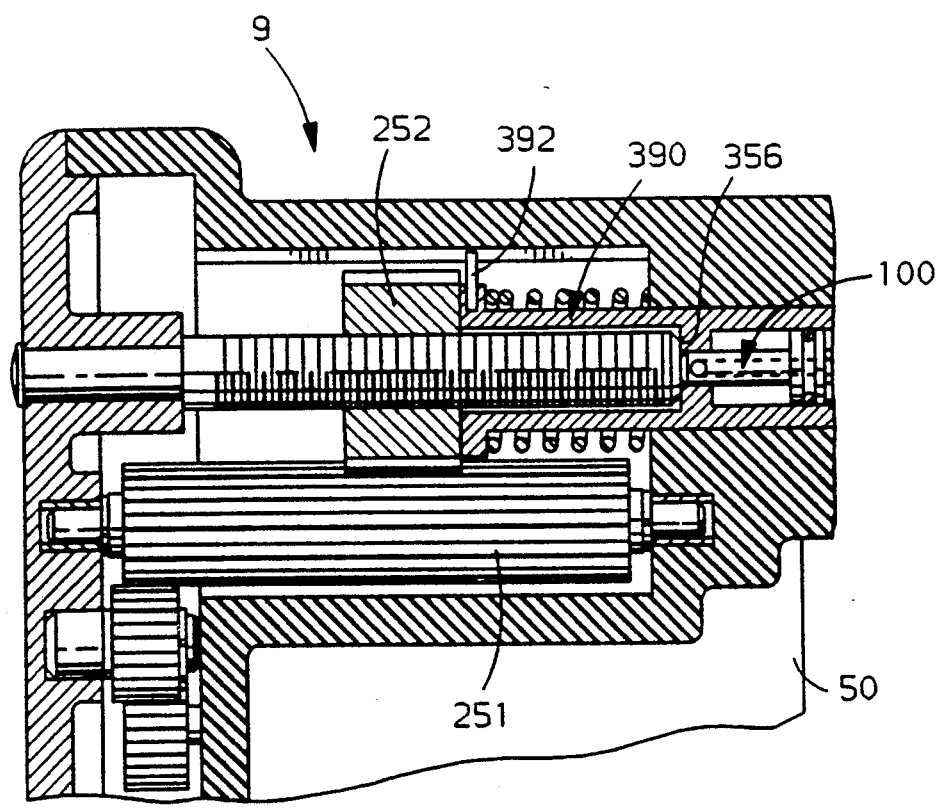

Referring to FIG. 3, a stop 356 is fixably connected to the housing. It serves in cooperation with the secondary piston 100 as previously described. The gear train which connects the motor 50 has been modified such that a gear 252 rotates upon the stop 356. Gear 252 is powered by gear 251 which is operatively connected with a motor.

The primary piston 390 at one end has a rod pin 392 to prevent the rotation of the primary piston 390 and the remainder of the operation of actuator 9 is substantially as previously described.

Figure 4:
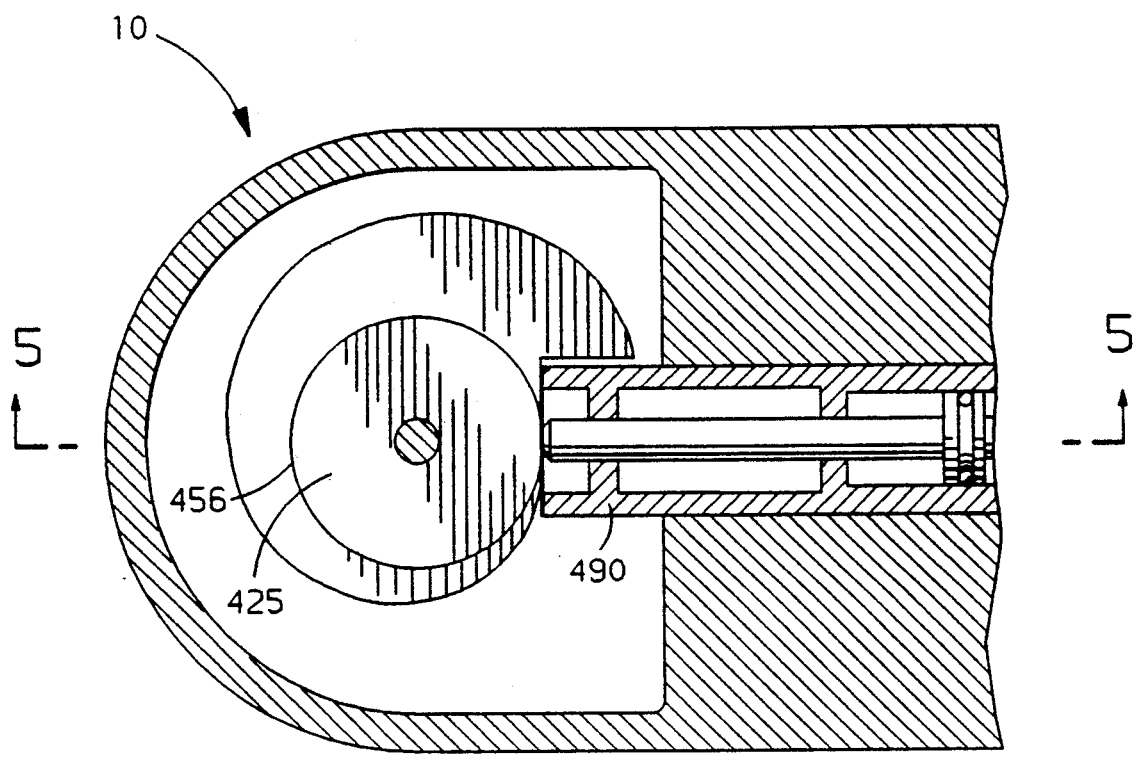
Figure 5:
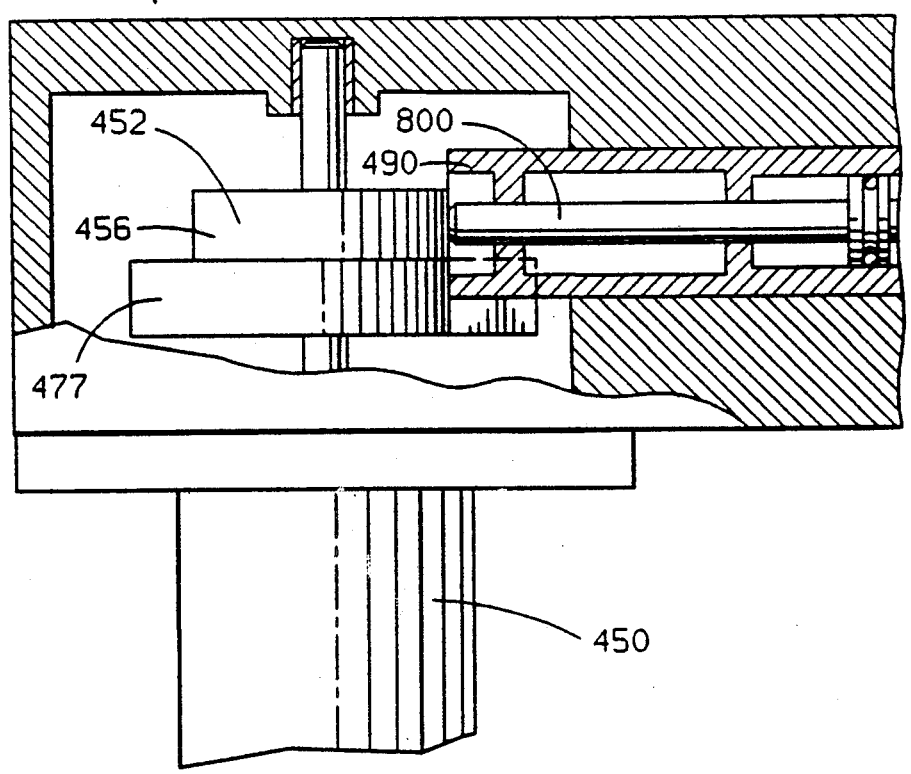
FIG. 5 is a view taken along line 5—5 of FIG. 4.

Referring additionally to FIGS. 4 and 5, the actuator 10 as shown has a motor 450 joined with a cam actuator 452. Actuator 452 has a surface 477 which operably translates modified primary piston 490. Secondary piston 800 has an elongated stem which rest upon a circular stop 456 such that rotation of the cam surface of the cam 452 will not affect the location of the stop means 456 unless of course when the primary piston end, not shown, hits the head of the secondary piston as previously described.

While embodiments of the present invention have been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. An anti-lock braking system (ABS) and traction control (TC) integration for a vehicle with a master cylinder, a reservoir and a wheel brake cylinder, said integration in combination comprising:

an actuator housing with an interior bore with a first fluid connection with said master cylinder, a second fluid connection with said reservoir axially spaced from said first connection, and a third fluid connection with said wheel cylinder axially spaced from said second fluid connection;

a primary piston slidably mounted in said housing with an interior bore and a radial bore intersecting said interior bore for selective alignment with said housing first or second fluid connections;

first solenoid valve means normally open, said first solenoid valve means connecting said master cylinder with said wheel brake cylinder through a path independent of said actuator housing bore, and when energized said first solenoid valve means closes isolating said master cylinder from said wheel brake cylinder except through said actuator bore, and second solenoid valve means normally closed, said second solenoid valve means when energized to an open position connecting said reservoir with said housing second fluid connection;

sensor/computer means to sense the wheel speed of said wheel and to generate a signal in response thereto;

means to move said primary piston along said housing bore in response to said signal;

means for providing an axial stop within said housing bore; and secondary piston means slidably mounted within said primary piston having first and second landings forming a sealed chamber within said primary piston and having a head section sealably mounted within said housing bore exposed to said housing third fluid connection and said secondary piston having an interior passage connecting said housing third fluid connection with said secondary piston sealed chamber whereby when said integration is in a normal braking mode said secondary piston is held against said stop means and said master cylinder fluidly communicates through said housing first fluid connection out through said housing third fluid connection to said wheel cylinder and in an ABS mode said first solenoid valve means is energized to isolate said master cylinder from said wheel brake cylinder and said second solenoid valve means is energized to connect said reservoir with said housing second fluid connection and said primary piston is displaced in a first axial direction to fluidly communicate said wheel cylinder with said reservoir to relieve the fluid pressure within said wheel cylinder and upon a signal given by said sensor/computer means, said primary piston is displaced further in said first axial direction to close fluid communication of said wheel cylinder with said reservoir and to contact said secondary piston and displace the same to reapply the pressure to said brake and whereby said primary piston is moved in a similar manner as aforedescribed when said integration is in a traction control mode.

2. An ABS/TC integration as described in claim 1 further including a worm gear axially fixed in said housing powered by a motor, said worm gear being surrounded by a nut axially displaceable within said housing and in contact with said primary piston.

3. An ABS/TC integration as described in claim 2 wherein said nut is permanently joined with said primary piston.

4. An ABS/TC integration as described in claim 2 wherein said primary piston has a threaded end and said means to move said piston includes a nut threadably surrounding said primary piston, said nut being rotated by a motor.

5. An ABS/TC integration as described in claim 1 wherein the axial distance between said first and second fluid connections of said housing is equal to the axial distance of the end of said primary piston and said secondary piston head when said secondary piston is contacting said axial stop means.

6. An ABS/TC integration as described in claim 1 wherein said secondary piston has an interior passage connecting the exterior surface of said secondary piston of a portion of said secondary piston between said head and said sealed chamber with a portion of said secondary piston separated from said sealed chamber by said second landing.

7. An anti-lock braking system (ABS) and traction control (TC) integration for a vehicle with a master cylinder, a reservoir, and a wheel brake cylinder, said integration in combination comprising:

an actuator housing with an interior bore with a first fluid connection with said master cylinder, a second fluid connection with said reservoir axially spaced from said first fluid connection a first predetermined distance, and a third fluid connection with said wheel cylinder axially spaced from said first and second fluid connections;

a primary piston slidably mounted within said housing having an interior bore and a generally radial bore intersecting said interior bore for selective alignment with said housing first and second fluid connections;

a double solenoid valve having one normally open line allowing said master cylinder to communicate with said wheel cylinder and a second line normally closed for communicating said reservoir with said second housing fluid connection when said solenoid is energized, and when said solenoid is energized said solenoid isolates said master cylinder from said wheel cylinder;

sensor/computer means to sense the wheel speed of said wheel and to generate a signal in response thereto;

a worm gear rotatably and threadably engaged with said primary piston being axially fixed within said housing and operatively connected with a motor for translating said primary piston axially within said housing bore; and a secondary piston slidably mounted within said primary piston, said secondary piston having first and second landings forming a sealed chamber within said primary piston bore and said secondary piston having a head sealably mounted within said housing bore and exposed to said housing third fluid connection, said secondary piston having an interior bore connecting said sealed chamber with said housing end adjacent said third fluid connection and said secondary piston having an end contacting with said worm gear in a normal braking mode and wherein said head of said secondary piston is at said first predetermined distance from an end of said primary piston when said secondary piston contacts said worm gear and whereby when said integration is in said normal braking mode said master cylinder communicates with said wheel cylinder through said first housing fluid connection and said housing third fluid connection, and an ABS mode said solenoid valve is energized in response to the signal from said sensor means and said screw is rotated in a first angular direction by said motor to translate said primary piston in a first axial direction aligning said radial bore with said housing second fluid connection to relieve the pressure within said wheel cylinder and whereupon in response to the signal from said sensor/computer means said motor is again translated in said first axial direction and said primary piston is translated in said first axial direction to make contact with said secondary piston head to reapply pressure to said wheel cylinder and wherein said primary piston moves in a similar manner as aforedescribed when said integration is in a traction control mode.

8. A method of anti-lock braking and traction control for a vehicle having a master cylinder, a reservoir and a wheel brake cylinder, said method in combination comprising:

connecting an actuator housing with an interior bore with a master cylinder via a first fluid connection, a reservoir via a second fluid connection and a normally closed second solenoid valve line, and the wheel cylinder via a third fluid connection;

connecting the master cylinder independently of the actuator bore with the wheel brake cylinder via a normally open first solenoid valve line;

slidably mounting with said housing bore a primary piston having an interior bore and a radial bore intersecting therewith;

slidably mounting within said primary piston a secondary piston having a head sealably mounted within said housing bore and exposed to said third fluid connection of said housing bore with said wheel cylinder and said secondary piston having first and second landings forming a sealed chamber within said primary piston and having an interior bore allowing fluid communication between said sealed chamber and said housing third fluid connection with said wheel brake cylinder; and providing means of movement of said primary piston whereby in a normal braking mode fluid communicates between said master cylinder and said wheel cylinder through said housing first connection, said primary piston radial bore into said sealed chamber and said third fluid connection and whereby when said system goes into an anti-lock or traction control mode said first solenoid valve line closes to isolate said master cylinder from said wheel cylinder and said second solenoid valve line switches to communicate said reservoir with said housing and said primary piston is translated in a first axial direction to align said radial bore with said second fluid connection of said housing with said reservoir to relieve the pressure of said braking system and whereupon reapply of pressure to said braking system, said primary piston is translated in the same axial direction.

* * * * *